(12) United States Patent
Shin et al.

(10) Patent No.: US 8,388,441 B2
(45) Date of Patent: Mar. 5, 2013

(54) METHOD FOR DISPLAYING INFORMATION ABOUT USE OF HACK TOOL IN ONLINE GAME

(75) Inventors: Dong Woo Shin, Incheon (KR); Kee Chul Kim, Seoul (KR); Jae Hwang Lee, Gyeonggi-do (KR); Young Hwan Kim, Seoul (KR); Kyu Ho Lee, Seoul (KR)

(73) Assignee: Inca Internet Co., Ltd., Seoul (KR)

( * ) Notice: Subject to any disclaimer, the term of this patent is extended or adjusted under 35 U.S.C. 154(b) by 0 days.

(21) Appl. No.: 12/957,360

(22) Filed: Nov. 30, 2010

(65) Prior Publication Data

US 2011/0294572 A1 Dec. 1, 2011

(30) Foreign Application Priority Data

May 25, 2010 (KR) ........................ 10-2010-0048582

(51) Int. Cl.
*A63F 9/24* (2006.01)
(52) U.S. Cl. .......................................... 463/29; 705/51
(58) Field of Classification Search .................... 463/29; 705/51
See application file for complete search history.

(56) References Cited

U.S. PATENT DOCUMENTS

| | | | |
|---|---|---|---|
| 7,169,050 B1* | 1/2007 | Tyler | 463/42 |
| 7,288,027 B2* | 10/2007 | Overton | 463/42 |
| 8,221,238 B1* | 7/2012 | Shaw et al. | 463/42 |
| 2004/0242321 A1* | 12/2004 | Overton | 463/29 |
| 2008/0004107 A1* | 1/2008 | Nguyen et al. | 463/29 |
| 2008/0305869 A1* | 12/2008 | Konforty et al. | 463/29 |
| 2009/0144825 A1* | 6/2009 | Schluessler et al. | 726/23 |
| 2010/0223656 A1* | 9/2010 | Ray et al. | 726/3 |

FOREIGN PATENT DOCUMENTS

WO WO2008/005264 A2 * 1/2008

OTHER PUBLICATIONS

Kabus et al. ("Design of a Cheat-Resistant P2P Online Gaming System", Databases and Distributed Ssytems Group, Technische Universitaet Darmstadt, Germany, 2007, ACM, 8 pages).*

(Continued)

*Primary Examiner* — James D Nigh
(74) *Attorney, Agent, or Firm* — Husch Blackwell LLP

(57) ABSTRACT

Disclosed herein is a method for displaying information about the use of a hack tool in the online game. When a game IDentification (ID) is input, a client system accesses a security server, and requests and receives the number of times that one or more hack tools have been used for the game ID. The client system provides the game ID and the number of times that hack tools have been used to a game server so that the number of times that hack tools have been used is shared by one or more gamers who participate in the game provided by the game server. When the client system detects the use of a hack tool, the client system increases the number of times that hack tools have been used for the game ID by 1, and provides the number of times that hack tools have been used to the security server.

8 Claims, 2 Drawing Sheets

OTHER PUBLICATIONS

Laurens et al. ("A Novel Approach to the Detection of Cheating in Multiplayer Online Games", 12th IEEE International Conference on Engineering Complex Computer Systems, ICECCS 2007, Mar. 2007, 10 pages.*

Weisz ("Detecting Cheaters in a Distributed Multiplayer Game", School of Computer Science, Carnegie Mellon University, May 2, 2003, 28 pages).*

Yan et al. ("A Systematic Classification of Cheating in Online Games", NetGames '05, Oct. 10-11, 2005, ACM, 9 pages).*

KIPO Office Action dated Jun. 28, 2012 for Application No. 10-2010-0048582.

KIPO Office Action dated Jan. 3, 2012 for Application No. 10-2010-0048582.

* cited by examiner

METHOD FOR DISPLAYING INFORMATION ABOUT USE OF HACK TOOL IN ONLINE GAME

CROSS-REFERENCE TO RELATED APPLICATIONS

The present application claims priority to and incorporates herein by reference Korean Patent Application Serial No. 10-2010-0048582 filed on May 25, 2010.

BACKGROUND OF THE INVENTION

1. Field of the Invention

The present invention relates generally to a method for preventing one or more hack tools from being used in the online game, and, more particularly, to a method for sharing and displaying information about the use of hack tools, such as a program and hardware which have not been permitted for use in the online game, on the computers (client systems) of garners who participate in the corresponding online game.

2. Description of the Related Art

With the wide popularization of ultrahigh-speed Internet, the online game population has rapidly increased and a plurality of online games has been developed. However, the recognition and perceptions of game security are still very weak. Illegal programs in computers are called hacks or hacking programs, and hacks or hacking programs in games are called game hacks. Game hacks refer to programs that are used to fabricate the files or memory of specific game processes.

Such a game hack enables a game user to easily win the game by replacing specific data, such as ability or strength, by increasing the speed of a blow or the number of blows in the case of a fighting game, or by providing macro functions in such a way as to fabricate the memory of the game. Therefore, users want to install game hacks when they play the online games. However, the use of game hacks in the online game may cause problems of breaking down the balance between users and overloading the game server. That is, with regard to the online games, if some users play the game while gaining the upper hand thanks to illegal methods, the balance with other users is lost, and the balance of the entire online game is lost in critical situations, so that a game server becomes overloaded.

Meanwhile, hardware or a program, which users want to use in the online games, includes "an auto mouse" or "an auto macro Program". The auto mouse is a device which enables the right or left button of a mouse to be automatically clicked, and the auto macro program is a device which enables various mouse operations to be sequentially performed. The auto mouse and the auto macro program are implemented by programs or hardware. When an auto mouse is used in a computer system, a specific user can easily play the game while gaining the upper hand using illegal methods, the balance with other users is lost, and the balance of the entire online games is lost, so that a game server becomes overloaded.

The use of devices which break down the balance with other users, such as game hacks, auto mouse, or auto macro programs, is not permitted in the online games. In the specification of the present invention, all programs and hardware which are not permitted for use in the online games are called "hack tools". It is apparent that the kind of hardware or programs that have been determined to be hack tools may vary per online game in conformity with the policies of online game suppliers. For example, when a program is permitted in one specific online game but the program is not permitted in other online games, the program may be determined as a hack tool.

In order to restrict users from using hack tools, game providers request users to install security programs together with corresponding games in the client systems of the users. When a user executes such a game program, a game process is executed, and a security process is successively and automatically executed. If the user stops the security process when the game is played, the game process is stopped together with the security process. That is, when the online game is played, a security process is executed together with a game process, and the security process blocks one or more game hack tools which are designated as non-permitted programs for the corresponding online game.

Generally, 'programs' and 'files' mean the collection of commands sequentially written in order to be executed on a computer, and 'processes' refer to programs which are executed on a computer. That is, game programs function as game processes and are executed on client systems, security programs function as security processes and are executed on client systems, and security processes detect and block hack tools executed on client systems.

When users use hack tools in client systems, security processes stop the use of the hack tools. However, it is important for online game suppliers to obtain online game users, so that the online game suppliers do not actively disable users from playing corresponding online games even though users repeatedly use hack tools. Therefore, when game users are blocked because they are using hack tools, they can participate in corresponding online games again without sanctions even if they log in again.

That is, since online game suppliers have not actively implemented sanctions against users depending on the number of times that one or more hack tools are used, the number of times that hack tools are used by some vicious users has not decreased at all, so that well-intentioned users who normally play the games without using hack tolls have suffered.

SUMMARY OF THE INVENTION

Accordingly, the present invention has been made keeping in mind the above problems occurring in the prior art, and an object of the present invention is to provide a method for displaying information about the use of a hack tool in the online game, which enables the number of times that one or more hack tools have been used for each game user in the online game to be shared by the client systems of other users who participate in the corresponding online game, so that game users are induced to voluntarily reject some users who frequently use a hack tool from a corresponding game group, thereby controlling the use of a hack tool.

In order to accomplish the above object, the present invention provides a method for displaying information about the use of a hack tool in the online game, the method including: a first step of, when a game IDentification (ID) is input one or more client systems accessing a security server, and requesting and receiving the number of times that one or more hack tools have been used for the game ID; a second step of each of the client systems providing the game ID and the number of times that hack tools have been used to a game server so that the number of times that hack tools have been used is shared by one or more garners who participate in the game provided by the game server; and a third step of, when the client system detects the use of a hack tool, increasing the number of times that hack tools have been used for the game ID by 1, and providing the number of times that hack tools have been used to the security server.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
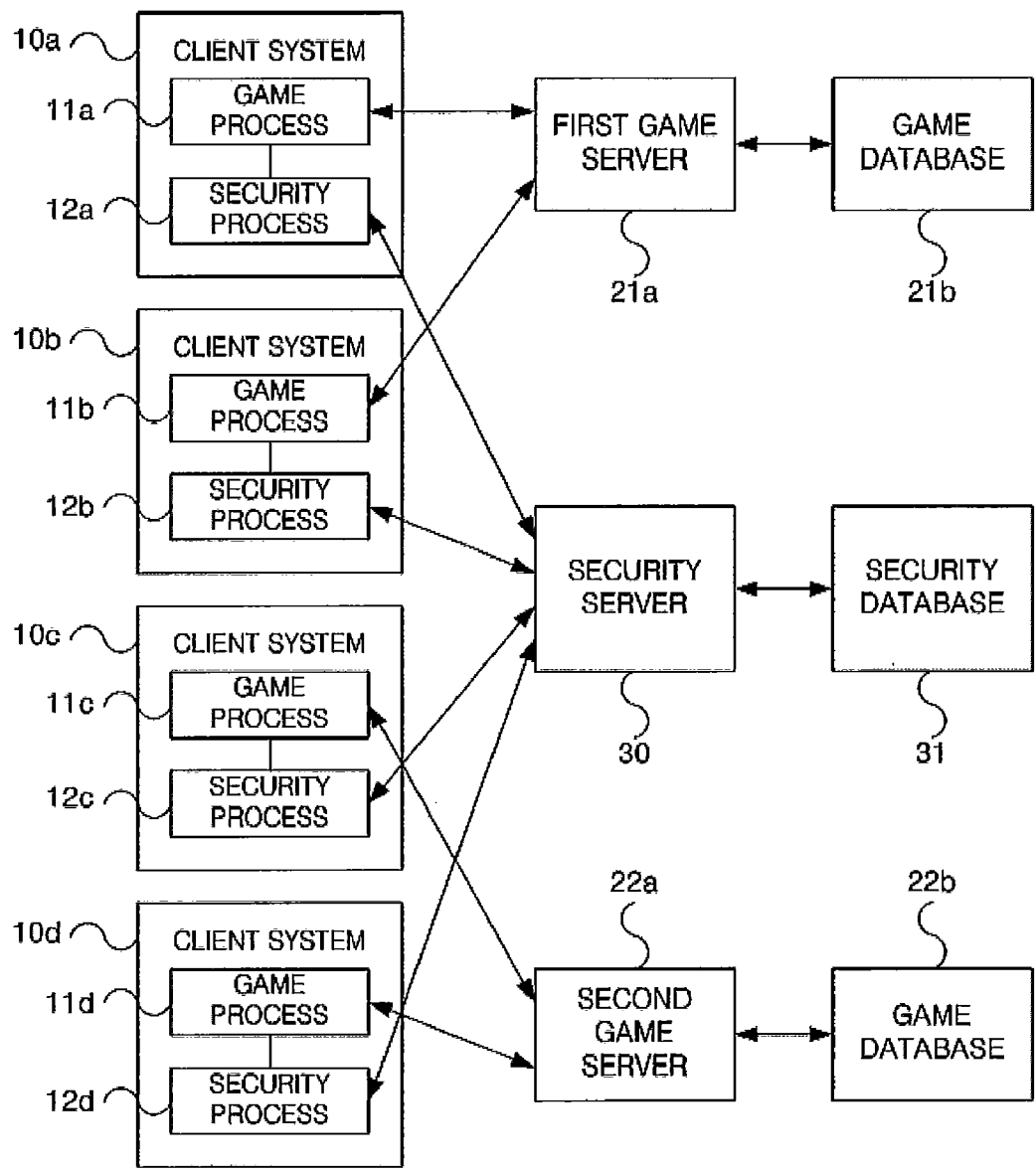
FIG. 1 is a diagram showing an online game system to which the present invention is applied.

Reference now should be made to the drawings, in which the same reference numerals are used throughout the different drawings to designate the same or similar components.

A method for displaying information about the use of a hack tool in the online game according to an embodiment of the present invention will be described in detail with reference to the accompanying drawings below.

FIG. 1 is a diagram showing an online game system to which the present invention is applied. A plurality of client systems 10a, 10b, 10c, and 10d access a game server 21a or 22a, and download and install a game program. Further, the client systems 10a, 10b, 10c, and 10d access a security server 30, and download and install a security program. When users execute the game program installed in each of the client systems 10a, 10b, 10c, and 10d, game processes 11a, 11b, 11c, and 11d and security processes 12a, 12b, 12c, and 12d are executed at the same time.

Each of the game databases 21b and 22b of the game servers 21a and 22a stores a level, a class, ranking, a joined clan name, a winning average, the number of times that a corresponding user killed the enemy, and the number of times that the user died for each game Identification (ID).

It is assumed that the client systems 10a and 10b are user computers for the game provided from the first game server 21a, and that the game processes 11a and 11b, executed on the respective client systems 10a and 10b, access the first game server 21a. Meanwhile, it is assumed that the client systems 10c and 10d are user computers for the game provided from the second game server 22, and that the game processes 11c and 11d, executed on the respective client systems 10c and 10d, access the second game server 22a.

Each of the users accesses the corresponding game server 21a or 22a through one of the corresponding game processes 11a, 11b, 11c, and 11d, and then logs in to the game server with his/her game ID. Then, the corresponding game server 21a or 22a provides information stored and related to the corresponding game ID (a level, a class, ranking, a joined clan name, a winning average, the number of times that a corresponding user killed the enemy, and the number of times that the user died) to the corresponding client systems.

Meanwhile, a game server for the online game commonly includes a plurality of game divergence servers, each of the divergence servers includes a plurality of game rooms, and users who entered the same game room divide up into teams and then play of the online game moves forward. In the specification of the present invention, a plurality of game servers and a plurality of game divergence servers are called "a game server".

When a user logs in to a game server (or logs in to the game server and then selects a specific divergence game server), the game server recognizes that the user having a corresponding game ID is in a game waiting state. In this state, if the user selects a specific game room, the game server provides information stored and related to each of the game IDs (a level, a class, ranking, a joined clan name, a winning average, the number of times that a corresponding user killed the enemy, and the number of times that the user died) of all the users who entered the corresponding game room and the current states of the users (a game playing state or a game waiting state) to the corresponding client system. Game IDs and information related to the game IDs of users who newly enter or exit are shared by all users who previously entered the corresponding game room and are waiting to play the game or are playing the game.

Meanwhile, the game processes and the security processes are executed at the same time. The security processes 12a, 12b, 12c, and 12d access the security server 30 and download the latest hack tool examination engine.

When all the users, who selected and entered the corresponding game room, are divided into two teams and preparation is completed, the game can start. Here, each of the users can check information related to all the users who entered the corresponding game room, and then select or reject one or more gamers who participate in the corresponding game.

Since the actual online game is moved forward by loading a game file installed in the corresponding client system 10a, 10b, 10c, or 10d, such a user can abnormally play the game by installing a hack tool in the client system 10a, 10b, 10c, or 10d and hooking or forging a graphic-related library file, or by forging strength data value or bullet data value loaded in memory. Here, each of the security processes 12a, 12b, 12c, and 12d detects whether a hack tool is used in the corresponding client system 10a, 10b, 10c, or 10d using a hack tool examination engine. If the use of a hack tool is detected, the security process 12a, 12b, 12c, or 12d stops the corresponding hack tool or terminates the corresponding game process 11a, 11b, 11c, or 11d forcibly. Of course, when the game process 11a, 11b, 11c, or 11d is terminated, the corresponding security process 12a, 12b, 12c, or 12d is terminated.

Meanwhile, if the online game terminates normally, the game server 21a or 22a updates information related to game IDs (a level, a class, ranking, a joined clan name, a winning average, the number of times that a corresponding user killed the enemy, and the number of times that the user died) and then stores the updated information in the game database 21b or 22b.

The present invention proposes a method of displaying the cumulative number of times that one or more hack tools have been used for each game ID when information related to the game ID is shared and displayed on the screens of the client systems of garners who participate in the corresponding online game in the above-described online game system.

The present invention will be described based on the client system 10a.

The security server 30 includes a security database 31 for storing online games and the cumulative number of times that one or more hack tools have been used for each game ID. The security database 31 can distinguish the kind of a hack tool, can accumulate the number of times that each kind of the hack tool has been used, and then can store the accumulated number of times. Furthermore, the security database 31 stores a method of displaying the cumulative number of times that hack tools have been used for each online game. If an online game name and a game ID are input from the security process installed on the client system, the security server 30 provides the cumulative number of times that hack tools have been used and a display method thereof, which have been stored in the security database 31, to the corresponding security process.

The security process or the game process provides the game ID, the cumulative number of times that one or more hack tools have been used and the display method thereof to the game server 21a. The game server 21a provides the cumulative number of times that hack tools have been used for the game ID and the display method thereof to a plurality of client systems which accessed the corresponding game server 21a so that information about the cumulative number of times that hack tools have been used for the game ID is displayed on the plurality of client systems.

Figure 2:
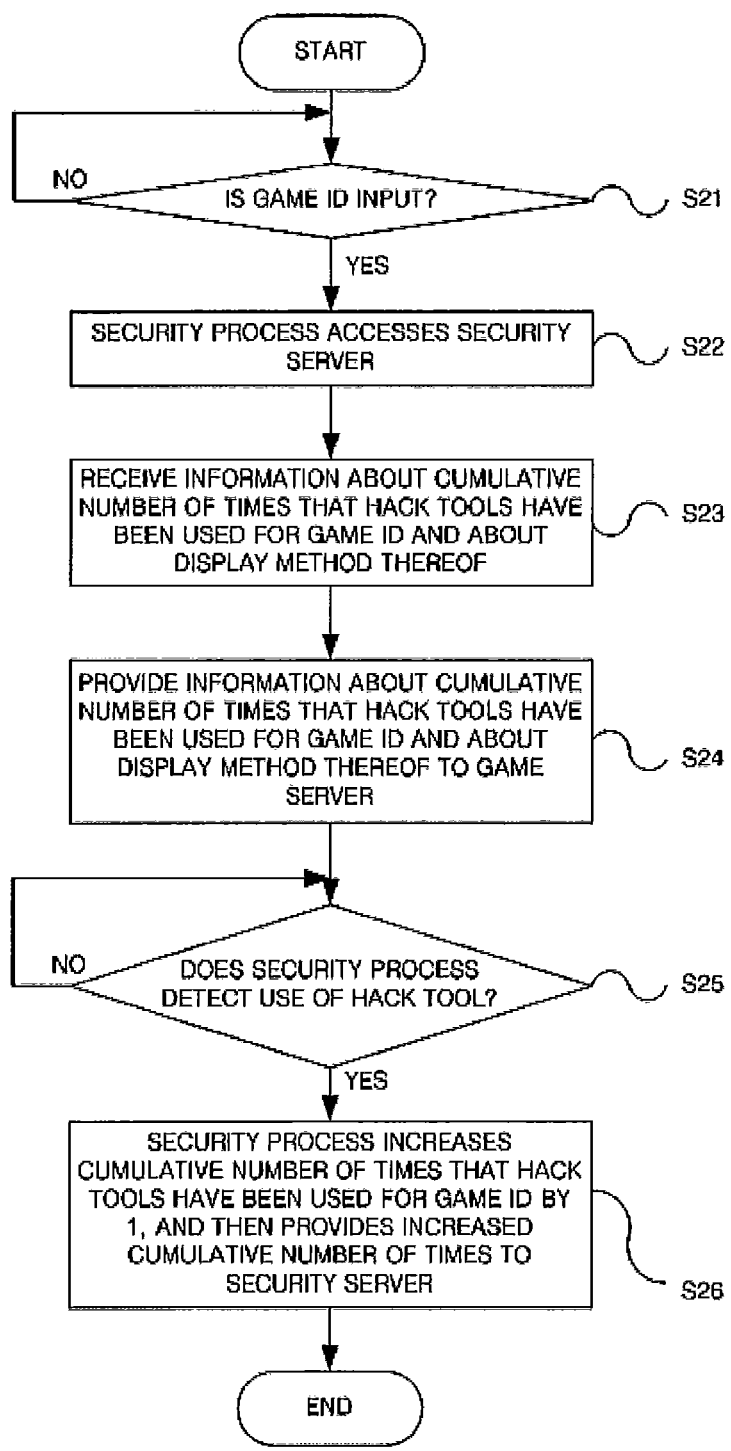
FIG. 2 is a flowchart showing a method for displaying information about the use of a hack tool in the online game according to the present invention.

FIG. 2 is a flowchart showing a method for displaying information about the use of one or more hack tools in the online game according to the present invention.

If the game process 11a and security process 12a of the client system 10a are executed and a game user inputs a game ID to the first game server 21a using the client system 10a at step S21, the security process 12a accesses the security server 30 at step S22, makes an inquiry about information about the cumulative number of times that hack tools have been used for the corresponding input game ID of the online game provided from the first game server 21a and about a display method thereof; and receives the information at step S23.

The game process 11a or the security process 12a provides information about the cumulative number of times that hack tools have been used and the display method thereof together with the game ID to the first game server 21a at step S24. When a plurality of client systems accessed the first game server 21a share the information related to the game user (a level, a class, ranking, a joined clan name, a winning average, the number of times that a corresponding user killed the enemy, and the number of times that the user died), the first game server 21a additionally displays the cumulative number of times that hack tools have been used based on the display method thereof.

Meanwhile, if the game user uses a hack tool when the online game is being moved forward and the security process detects the use of the hack tool at step S25, the security process 12a forcibly terminates the game process 11a while the security process 12a blocks the hack tool, and, at the same time, the security process 12a increases the cumulative number of times that hack tools have been used for the corresponding game ID input from the security server 30 by 1, and then provides the cumulative number of times that hack tools have been used to the security server 30 so that the cumulative number of times that hack tools have been used is stored in the security database 31 at step S26.

The display method includes a game ID color conversion display method, a directly diagnosed frequency display method, and a specific mark display method. The game ID color conversion display method is a method of displaying game IDs using different colors according to levels depending on the cumulative number of times that hack tools have been used. For example, the colors of game IDs are displayed using different colors depending on the cumulative number of times that hack tools have been used in such a way that a game ID is displayed using a light orange color when the cumulative number of times that hack tools have been used falls in the range of 1 to 4, and that the corresponding game ID is displayed using a deep orange color when the cumulative number of times falls in the range of 5 to 10. The directly diagnosed frequency display method is a method of displaying game IDs and the cumulative number of times that hack tools have been used for the corresponding game IDs using figures.

In this method, the game IDs and the cumulative number of times can be displayed by classifying the kind of hack tools, and classifying the cumulative number of times depending on the resulting kind of the hack tools. The specific mark display method is a method of displaying specific marks according to level, similar to the game ID color conversion display method. For example, a specific mark is displayed together with a game ID in such a way that the "H" mark is displayed when the cumulative number of times that hack tools have been used falls in the range of 1 to 4, the "D" mark is displayed when the cumulative number of times that hack tools have been used falls in the range of 5 to 10, and a skeleton mark is displayed when the cumulative number of times that hack tools have been used falls in the range of 11 to 14.

When the use of a hack tool is detected, the security process or the security server stores the date on which the use of the hack tool is detected, and decrease the cumulative number of times that hack tools have been used by 1 when a predetermined period elapses from the date on which the use of the hack tool is detected. Therefore, information about the use of the hack tool is removed if the game user does not use a hack tool for a predetermined period even though the game user used the hack tool before.

Furthermore, when the cumulative number of times that hack tools have been used for each game ID is displayed, the recent date on which the use of the hack tool is detected may be additionally displayed.

The above-described game server can display the cumulative number of times that hack tools have been used for each game ID in a waiting state as well as in a game room.

According to the above-described invention, when the online game is played, the number of times that one or more hack tools have been used for each user is shared and revealed, so that users voluntarily reject some users who have used hack tools a large number of times from the corresponding online game, with the result that there is an advantage of controlling the use of hack tools of the game users without engaging one or more online game suppliers therein.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for use in an online game system in which a plurality of client systems, a game server and a security server communicate with each other over an Internet, and in which the game server stores game-related information for a game Identification (ID) of each of a plurality of gamers and transfers the game-related information to the client systems, and the security server stores a number of times that one or more hack tools have been used for the game ID, the method for displaying information about use of one or more hack tools for each game ID on the client systems, the method comprising:

a first step of each of the client systems accessing the security server, requesting a number of times that one or more hack tools have been used for each logged-in game ID, and receiving the number of times that the hack tools have been used for each logged-in game ID from the security server;

a second step of each client system sending the number of times that the hack tools have been used for each logged-in game ID to the game server, so that the number of times that the hack tools have been used for each logged-in game ID can be shared amongst the gamers;

a third step of each client system receiving the number of times that the hack tools have been used for each logged-in game ID from the game server and displaying the number of times that the hack tools have been used for each logged-in game ID on a screen;

a fourth step of a security process installed on a client system determining whether one or more hack tools are being used on said client system; and based on the determination that one or more hack tools are being used on said client system, a fifth step of, said client system updating the number of times that the hack tools have been used for an associated logged-in game ID by increasing the number of times that the hack tools have been used for the logged-in game ID by one, and sending the updated number of times that the hack tools have been used for the logged-in game ID to the security server.

2. The method set forth in claim 1 wherein the first step comprises each client system receiving the number of times that the hack tools have been used for each logged-in game ID and a display method, and the second step comprises each client system providing the number of times that the hack tools have been used for each logged-in game ID and the display method to the game server.

3. The method as set forth in claim 2, wherein the method comprises a game ID color conversion display method of displaying one or more game IDs using different colors depending on the number of times that hack tools have been used.

4. The method as set forth in claim 2, wherein the method comprises a directly diagnosed frequency display method of displaying the number of times that hack tools have been used using figures.

5. The method as set forth in claim 2, wherein the method comprises a specific mark display method of displaying one or more specific marks depending on the number of times that the hack tools have been used.

6. The method as set forth in claim 1, wherein the fourth step comprises said client system further providing a date on which the use of the hack tools was detected to the security server and the security server further storing the date on which the use of the hack tools was detected.

7. The method as set forth in claim 6, wherein the first step comprises each client system further receiving the date on which the use of the hack tools was detected from the security server; and the second step comprises each client system further providing the date on which the use of the hack tools was detected to the game server.

8. The method as set forth in claim 6, wherein the number of times that hack tools have been used decreases by 1 when a predetermined period elapses from the date on which the use of the hack tool is detected.

* * * * *